Dec. 30, 1947.  A. G. KANDOIAN  2,433,369
ANTENNA SYSTEM AND METHOD OF USING SAME
Filed July 24, 1942  4 Sheets—Sheet 3
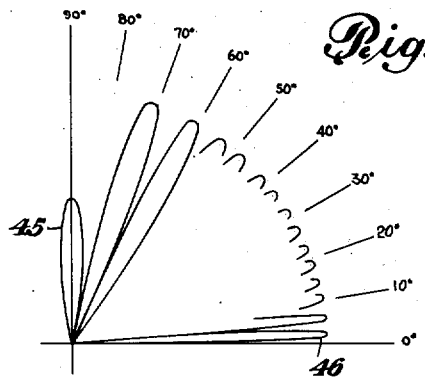
Fig. 3.
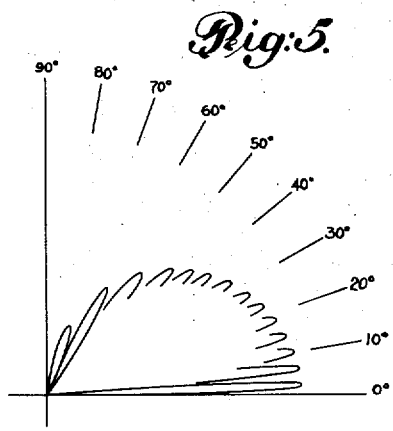
Fig. 5.
Fig. 6.
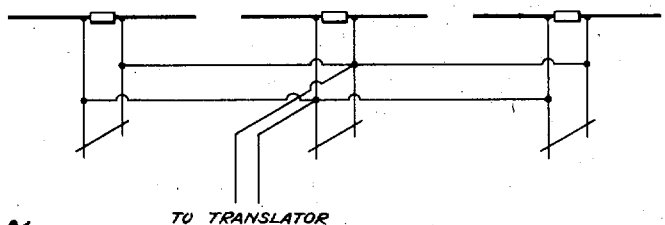
TO TRANSLATOR
Fig. 7.
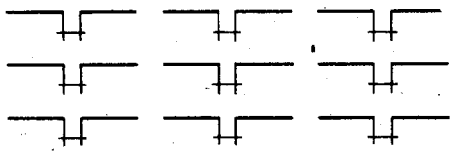
INVENTOR
ARMIG G. KANDOIAN
BY
ATTORNEY

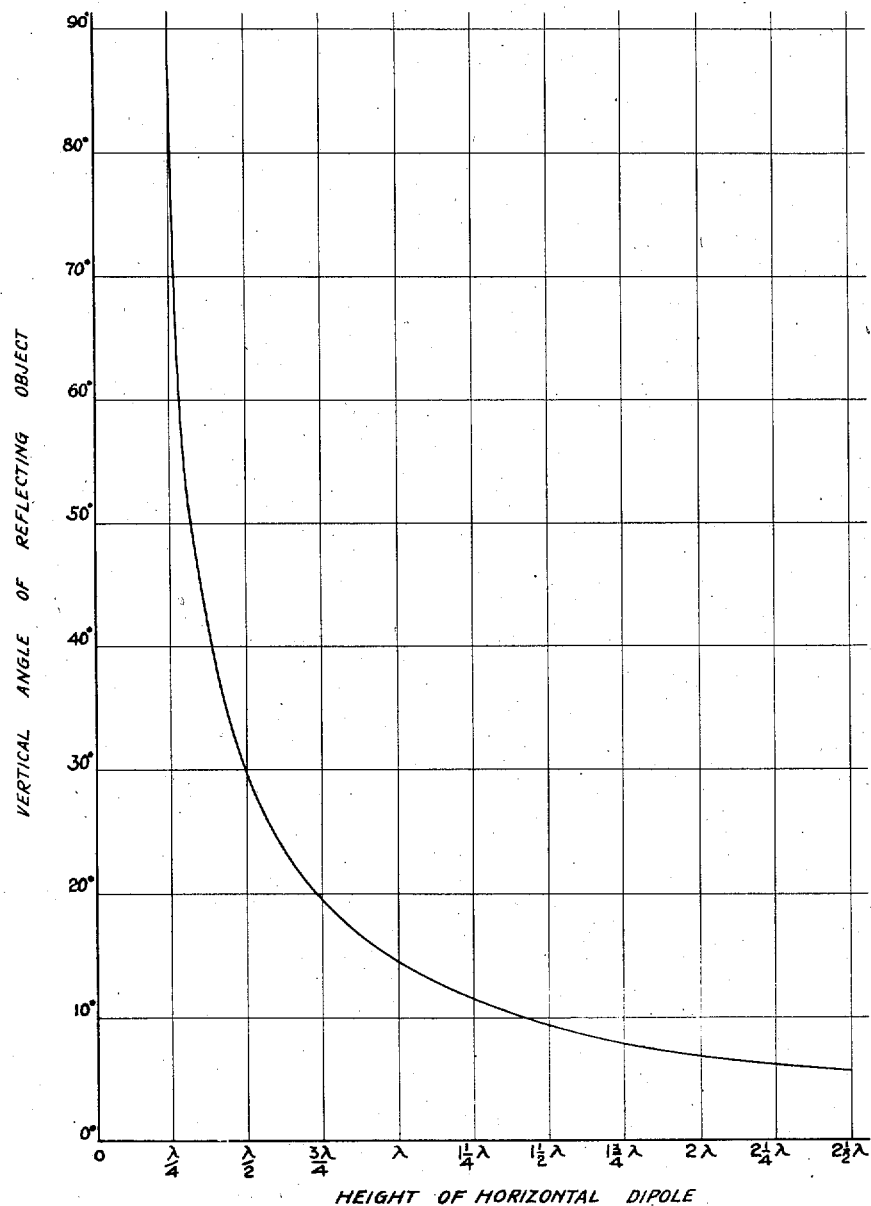

Patented Dec. 30, 1947

2,433,369

UNITED STATES PATENT OFFICE 2,433,369

ANTENNA SYSTEM AND METHOD OF USING SAME

Armig G. Kandoian, New York, N. Y., assignor to Federal Telephone and Radio Corporation, a corporation of Delaware Application July 24, 1942, Serial No. 452,124

4 Claims. (Cl. 250—1.50)

This invention relates to antenna systems and more particularly to adjustable antennae and method for using same to scan over a range of angles in vertical planes.

In the use of short-wave radio locator equipment using the "echo" principle for locating approaching obstacles or craft, particularly aircraft, it is necessary to provide for scanning a radiation pattern in a vertical direction in order to determine the altitude of an aircraft. Generally, at the same time horizontal scanning of the radiation pattern is effected to obtain the direction so that upon obtaining the distance to the craft, its position can be precisely located. In such systems considerable difficulty is encountered with the known types of equipment in ascertaining precisely the elevation angle of an aircraft. This difficulty is encountered because at low angles the tilting of a directive antenna will not be effective to indicate the altitude.

It is an object of my invention to overcome the aforesaid difficulty of vertical-angle scanning and, in accordance with my invention, I accomplish it by providing an antenna adjustable in height above the surface of the earth and utilize the radiation lobes developed when the antenna is raised or lowered, as the case may be, to locate the position of an aircraft in the vertical angle. This may be accomplished by adjusting the elevational position of the antenna until the first maximum indication is reached, or it may be accomplished by adjustment of the antenna unit until the minimum following the first maximum is reached. Thus, the maxima or minima, as the case may be, may be used to determine the vertical angle to the aircraft. By suitably calibrating the system the readings may be made directly in angles or, if fixed distances are determined in the direction of the aircraft, the calibration may be made to read directly the altitude of the craft.

According to a further feature of my invention, when the aircraft is located by observation of the proper maximum reading, this position may be checked by moving the antenna to a higher position to locate the corresponding null. This null will give a sharper direction indication than the maximum or lobe.

According to still further features of my invention, horizontal or vertical arrays may be used to sharpen the directive indications, or a combination array incorporating both horizontal and vertical features may be used. In this case the array should be so mounted as to be raised or lowered as a unit.

While I have described above the general principles and objects of my invention, a better understanding thereof may be had from the following detailed description to be read in reference to the accompanying drawings, in which:

Fig. 3 is a chart diagram of the radiation pattern for the antenna system shown in Fig. 1 elevated at about 7.14 wavelengths above the ground;

Fig. 4 is a chart showing a curve indicating the vertical angles of echo-reflecting obstructions for a plurality of vertical adjustments of the antenna;

Fig. 5 is a chart showing the radiation pattern for a horizontal loop antenna;

Fig. 6 is a schematic illustration of a horizontal antenna array; and

Fig. 7 is a schematic illustration of a combination of horizontal and vertical antenna arrays.

Figure 1:
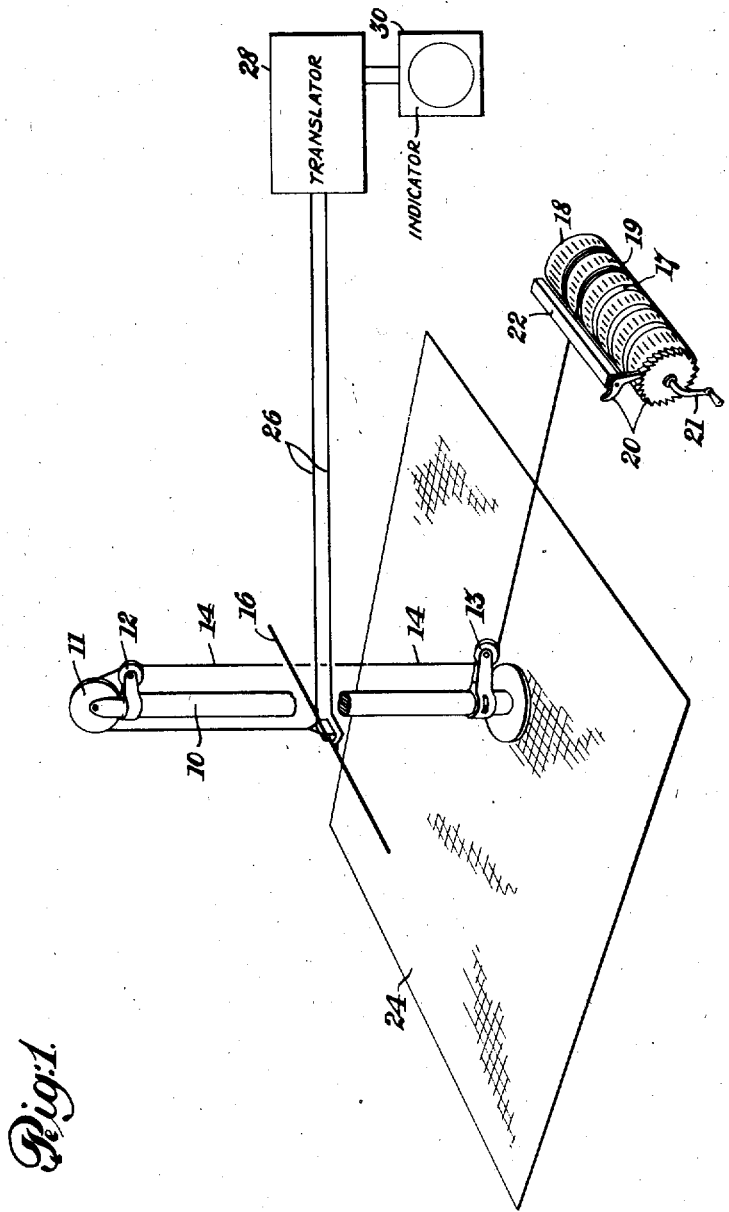
Fig. 1 is a schematic illustration in perspective of one form of apparatus by which the method of this invention may be practiced.

Referring to Fig. 1 of the drawings, a suitable mast 10 is shown supporting by means of pulleys 11, 12 and 13, a line 14 to which radiant acting means such as a dipole antenna 16 is attached. The line 14 is wrapped in grooves 17 on a drum 18 which is provided with a suitable pawl and ratchet mechanism 20 and a handle 21 whereby the height of the dipole 16 may be manually adjusted and maintained. The drum 18 is provided with calibrated portions adjacent the grooves 17 to indicate the height at which the dipole may be at any particular position of the drum. To assist in reading the calibrations, an element 22 having a straight edge disposed closely adjacent the drum may be provided.

To insure an effective ground in the vicinity of the dipole from which the height of the dipole may be determined, I provide a ground mat which may comprise a screen mesh or any other suitable mat construction at the base of the support 10. The mat 24 may be any desired shape, i. e. rectangular or circular, and extend horizontally about the antenna for a distance of one or two wavelengths. Since horizontally polarized energy is used, even an imperfectly conducting earth reflects substantially all the energy striking it at small angles, so the mat need not be very large.

The ground mat 24, however, may be omitted where the ground is satisfactory as a basis from which the height of the dipole may be measured.

Figure 2:
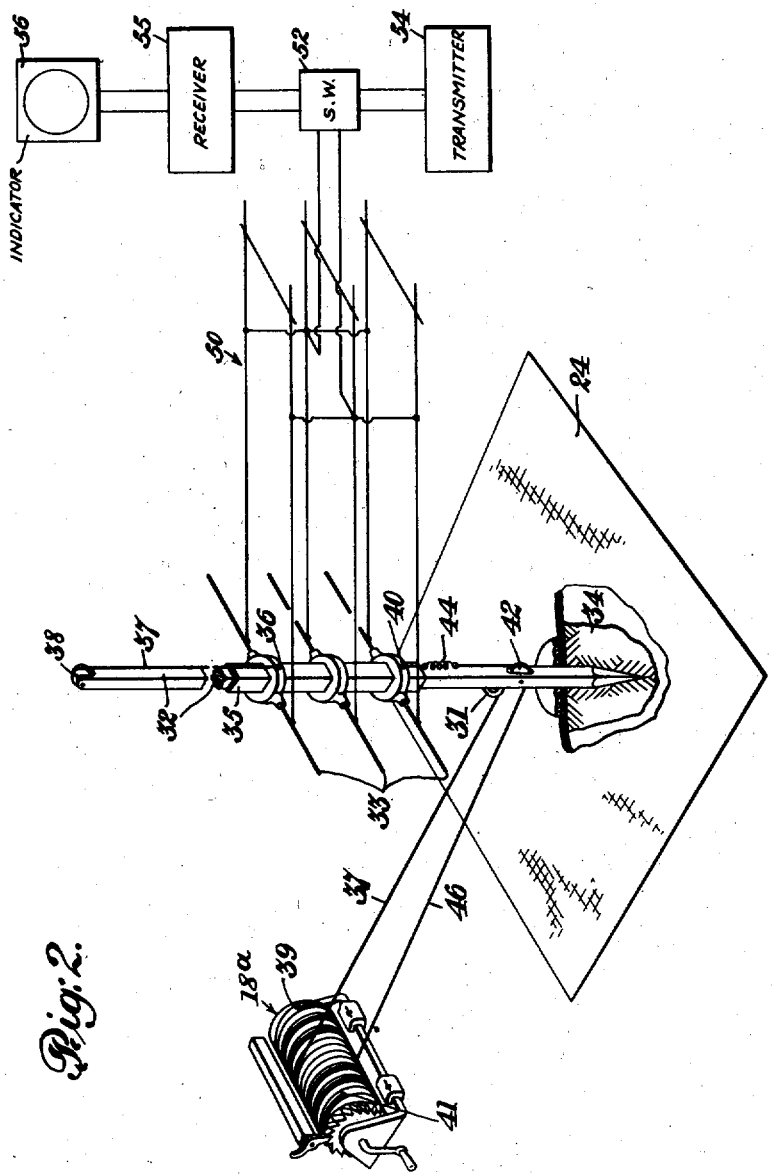
Fig. 2 is a view in perspective with parts broken away showing another form of an antenna system of the invention.

The dipole 16 may be connected by a suitable transmission line 26 to a translator 28 associated with an indicator 30 which may be of the cathode ray type. The translator may include a transmitter or a receiver or it may comprise, as shown in Fig. 2, both a transmitter and a receiver together with a suitable switching device whereby the antenna can be alternately used for transmission and reception. In this way, the same antenna may be used to transmit signals and to receive echoes for the purpose of determining the location of echo-producing obstructions.

Many antenna supporting arrangements and adjustable devices in addition to the form described above may be provided for the purpose of carrying out my method of vertical angle scanning. In Fig. 2, for example, I show another form of adjustable support for an antenna system. Certainly positioned with respect to the mat 24, I show another form of adjustable support for an antenna system. Centrally positioned with respect to the mat 24, I show a pole 32 anchored in the ground 34 and having slidable thereon a sleeve 35. Any suitable form of antenna or antenna array may be supported on the sleeve. For purposes of illustration I show the sleeve 35 provided with a vertical array of dipoles 33.

For vertical adjustment of the antenna, the sleeve may be connected at 36 to a line 37 riding over a pulley 38 at the upper end of the pole 32, the line extending downwardly therefrom axially of the pole to a pulley 31 adjacent the base of the pole and then laterally to a drum 18a. This drum may be calibrated and controlled by pawl and ratchet means similar to the drum construction shown in Fig. 1. The line 37, however, extends in several turns about the drum with one end thereof secured to the drum at 39. A second line 46 is secured to the drum at 41 and after a few turns on the drum extends to the pole 32 for passage over a pulley 42 and then to the sleeve 35 to which it is connected at 40. The line 46 may include a spring 44 to provide resilience to the line.

The drum 18a may, however, comprise a narrow wheel with the lines 37 and 40 connected together as a single line having a few turns about the wheel to provide a tight driving grip. If desired, a suitable chain and sprocket wheel may be substituted for the drum and line. Should either of these forms be used, a suitable counter or indicator with or without reduction gearing, as the case may require, would then be desirable to determine the adjusted height of the antenna.

The dipoles 33 may be connected by a suitable network 50 to a switching device 52 whereby the antenna can be selectively connected electrically to a transmitter 54 and a receiver 55. The receiver may have associated therewith a suitable indicator 56 of the cathode ray or other type. Thus, the same radiant acting means may be used for both the transmission of signals and the reception of reflections or echoes of the transmitted signals. By manipulating the radiant acting means in accordance with my invention, a concentrated radiation beam may be caused to scan a range of vertical angles and should aircraft be in the range of the locator, a reception will be made of the reflection of signals caused by the presence of the craft in such range even though the craft be at a low vertical angle.

It is known that when a horizontal dipole is placed a quarter wave above ground, maximum radiation occurs in the vertical direction.

The general expression for the radiation pattern $F(\beta)$ at a vertical angle $\beta$ is given by the equation:

$$F(\beta) = \sin(\Delta \sin \beta)$$

where $\Delta$ is the height of the radiator above ground in electrical degrees. The maximum value of $F(\beta)$ may be taken as unity in computing the pattern.

The angle at which the maximum radiation takes place may be determined from the equation:

$$\sin(\beta) = \frac{n}{\Delta} 90°$$

where $n$ = the number of lobes.

At high spacings there may be a number of lobes but for the purpose of this invention the lowermost lobe is the one of interest. The angle for this lobe may be obtained by taking $n = $ to 1 in the above equation which then reduces to:

$$\sin(\beta) = \frac{1}{\Delta} 90°$$

From this it is clear that as the antenna is raised from the position at which one maximum in the vertical alone exists, that is a quarter wavelength above the earth, the vertical angle at which the maximum occurs becomes lower. At the height of a half wavelength, the pattern divides into two lobes, one for each quadrant above the axis of the abscissas. As the height is increased, the number of lobes increase in accordance with the number of wavelengths the antenna is raised above the ground. Consequently the angles should be read as the antenna is raised and the first maximum or the first minimum used to determine the angle.

Referring to Fig. 3 of the drawings, I have shown a chart of the radiation pattern for the dipole shown in Fig. 1 raised to a height of about 7.14 wavelengths above the ground which places the lowest maximum at approximately 2°. The pattern has a large number of lobes as indicated in the quadrant shown in the chart. For seven wavelengths, there would be fourteen lobes in each quadrant above the axis of the abscissas as indicated, and as an additional wavelength is partially added to the height of the antenna, a fifteenth lobe will appear as indicated at 45. Should the height be increased to 7½ wavelengths, the lobe 45 would split and add another lobe to the 14 lobes shown in the quadrant.

As is apparent from the chart in Fig. 3, the lobes decrease in width as they approach the horizontal. Thus for the lowermost lobe 46, the width is about two degrees when the dipole is at 7.14 wavelengths above ground. For radio location of aircraft or other obstructions at low vertical angles, I find that by elevating the antenna and thereby causing the radiation lobes produced thereby to scan the space in vertical planes, an aircraft at a low vertical angle causing the reflection of signals is easily detectable by adjusting the elevational position of the antenna until the first maximum indication is reached. The lowermost lobe of the pattern being very narrow, the maximum indication will give a fairly sharp indication of the vertical angle of the position of the echo-producing obstruction.

For a sharper indication of the vertical angle, the antenna may be elevated until a maximum reading is taken and then this position may be checked by moving the antenna to a higher position to locate the corresponding null. This null will give a sharper direction indication but the indication will be zero on the indicator screen and for this reason it may be preferable to follow the maxima and check occasionally by swinging to the minima. Whichever of these echo detecting systems is used, the drum or other indicating device associated with the adjustment feature of the invention may be appropriately calibrated to indicate the vertical angles which correspond to the positions of the radiation lobe characteristic at which the echo is most accurately detectable.

As hereinbefore stated, the indicating means of the system may be calibrated for fixed distances so that when the distance to an aircraft is determined by reception of a signal reflected by the craft and the vertical angle of the craft's position is determined by scanning the space in accordance with my invention, the precise altitude of the aircraft may be directly determined.

From the chart shown in Fig. 4, it will be readily apparent that my scanning system is especially accurate at low angles of aircraft elevation. Thus, for any angle up to about 20 or 25 degrees, the degree of movement of the antenna is substantial in proportion to the vertical angle scanned and may be easily calibrated. The calibration may in addition be made quite accurately up to angles of about 45 degrees. Above 45 degrees the sensitivity of the system is so lowered that detection becomes approximate only. For lower angles, the relative movement of the antenna increases for a given angle of scanning thereby increasing substantially the degree of accuracy of my system for direction finding at the lower angles.

For devices providing adjustment to heights of approximately two wavelengths accurate measurements may be obtained between angles of about 7 to 45 degrees. Equipment having this limited adjustment is readily adaptable for portable use. For lower angles the antenna must be adjustable to greater heights, and such more elaborate equipment, of course, may be permanently installed.

In the place of the dipole, other forms of radiant acting means may be provided. In the chart shown in Fig. 5, I have indicated the radiation pattern for a horizontal loop antenna. The lower lobes of the pattern are long and narrow thereby providing sharp beam characteristics highly suitable for vertical scanning. For low vertical angle detection, the horizontal loop form of antenna when used in accordance with my invention gives for many purposes satisfactory results.

In Fig. 6, I show a horizontal array of dipoles spaced a half wavelength apart center to center. Each dipole is provided with a stub-line transformer whereby the three or more dipoles, as the case may be, may be matched for in phase operation. This array provides a radiation pattern having a beam appearance concentrated for sharpness in the horizontal. When the array is elevated in accordance with my invention, the radiation beam thereof increases further in sharpness for echo detection in the vertical angles at right angles to the array.

In Fig. 2 of the drawings, I show a vertical array of dipoles which is preferably operated out of phase to provide a concentrated pattern in the vertical. Each of the horizontal and vertical arrays of Figs. 6 and 2 respectively, may be used separately or they may be used in combination as I have indicated in Fig. 7. When used in the combination form, the concentration of the pattern both in the horizontal and in the vertical provides an even more distinct beam which, of course, is highly desirable for sharp echo direction determination. It is not always possible nor necessary to use the combination vertical and horizontal array and for many direction finding purposes, the simpler forms of radiant acting means may be used.

From the foregoing, it is clear that the vertical scanning feature of this invention is particularly adaptable to radio locator devices such as are used for locating the precise position of approaching aircraft. It is recognized that many variations in the construction of the antenna supporting means as well as in the vertical adjustment feature thereof and the association thereof with calibrated instrumentalities are possible without departing from the invention. It is to be understood, therefore, that the forms herein shown and described are to be regarded as illustrative of the invention only and not as restricting the appended claims.

What I claim is:

1. The method of determining at a given location the vertical angle between the direction of an antenna system to an echo producing obstruction and the horizontal, comprising energizing said antenna system to produce a lobe of radiant energy having a known angular width, receiving on said antenna system reflected energy resulting from the reflection of said radiant energy from said obstruction, varying the height of said antenna system with respect to ground and indicating the variation in height of said antenna system which results when said received energy varies from a maximum to a minimum amount.

2. The method of determining at a given location the vertical angle between the direction of a radiant energy generating means to a reflecting object and the horizontal which comprises generating at said location a predetermined lobe of radiant energy, directing said lobe in the general direction of said object, receiving at said location reflected energy from said object, varying the height of the radiant energy generating means with respect to ground to cause said reflected energy to vary between a maximum and a minimum value, and indicating the height of said generating means when said reflected energy has said maximum and minimum values.

3. In a radio locator responsive to echoes produced by obstructions the location of which is desired, an antenna system mounted at a height above ground to provide multiple radiation lobes in a vertical plane, means for varying the height of said antenna system relative to ground to cause the radiation lobes produced thereby to sweep through a range of vertical angles, a transmitter, a receiver, means for alternately coupling the transmitter and receiver to the antenna system, means operatively associated with the receiver to indicate the intensity of the echo signal received, and means controlled by said height varying means to indicate the vertical angle of a radiation lobe characteristic at which the maximum reflection of signals from the obstruction is receivable.

4. In a radio locator responsive to echoes produced by obstructions the location of which is desired, an antenna system mounted at a height above ground to provide multiple radiation lobes in a vertical plane, means for varying the height of said antenna system relative to ground to cause the radiation lobes produced thereby to sweep through a range of vertical angles, a transmitter, a receiver, means for alternately coupling the transmitter and receiver to the antenna system, and means controlled by said height varying means to indicate the vertical angular position of a radiation lobe characteristic at which the echo of a transmitted signal is most accurately determinable.

ARMIG G. KANDOIAN.

REFERENCES CITED

The following references are of record in the file of this patent:

UNITED STATES PATENTS

| Number | Name | Date |
|---|---|---|
| 1,647,283 | Esau | Nov. 1, 1927 |
| 2,076,222 | Bruce | Apr. 6, 1937 |
| 2,157,159 | Brown | May 9, 1939 |
| 2,208,422 | Hugon | July 16, 1940 |
| 2,213,859 | Hahnemann | Sept. 3, 1940 |
| 2,231,929 | Lyman | Feb. 18, 1941 |
| 1,944,563 | Kruesi | Jan. 23, 1934 |
| 1,973,673 | Rice | Sept. 11, 1934 |
| 2,176,469 | Moueix | Oct. 17, 1939 |

FOREIGN PATENTS

| Number | Country | Date |
|---|---|---|
| 813,404 | France | Feb. 22, 1937 |
| 455,765 | Great Britain | Oct. 27, 1936 |

OTHER REFERENCES

Bell Telephone System Technical Publication, Monograph B-772, entitled "Determination of the Direction of Arrival of Short Radio Waves," by H. T. Friis et al., 1934.